(12) United States Patent
Lin

(10) Patent No.: US 7,743,465 B2
(45) Date of Patent: Jun. 29, 2010

(54) DAMPING HINGE APPARATUS

(75) Inventor: Ming-Han Lin, Taipei Hsien (TW)

(73) Assignee: Cheng Uei Precision Industry Co., Ltd, Taipei Hsien (TW)

(*) Notice: Subject to any disclaimer, the term of this patent is extended or adjusted under 35 U.S.C. 154(b) by 409 days.

(21) Appl. No.: 11/958,251

(22) Filed: Dec. 17, 2007

(65) Prior Publication Data

US 2009/0151121 A1 Jun. 18, 2009

(51) Int. Cl.
*E05F 1/08* (2006.01)
*E05D 11/08* (2006.01)
(52) U.S. Cl. .......................................... 16/303; 16/342
(58) Field of Classification Search ........... 16/337–339, 16/342, 330, 303, 374, 376, 377, 340, 54, 16/50; 361/679.06, 679.08, 679.11, 679.12, 361/679.27, 814; 455/90.3, 575.1, 575.3, 455/575.8; 379/433.12, 433.13; 348/373, 348/333.01, 333.06, 794; 188/290, 291, 188/293, 296, 322.5, 308
See application file for complete search history.

(56) References Cited

U.S. PATENT DOCUMENTS

| | | | | |
|---|---|---|---|---|
| 4,899,854 A * | 2/1990 | Cartoni | ...................... | 188/290 |
| 4,938,322 A * | 7/1990 | Sugasawara et al. | ........ | 188/290 |
| 5,301,775 A * | 4/1994 | Nedbal et al. | ................ | 188/290 |
| 5,996,132 A * | 12/1999 | Sorimachi | ........................ | 4/236 |
| 6,115,886 A * | 9/2000 | Fujita | ............................ | 16/330 |
| 6,125,507 A * | 10/2000 | Katoh | ............................ | 16/329 |
| 6,913,125 B2 * | 7/2005 | Hayashi | ........................ | 188/290 |
| 7,065,834 B2 * | 6/2006 | Lowry | ............................ | 16/330 |
| 7,275,626 B2 * | 10/2007 | Fukuzawa et al. | ............ | 188/296 |
| 7,428,952 B2 * | 9/2008 | Miyamoto | .................... | 188/290 |
| 7,596,830 B2 * | 10/2009 | Yin et al. | ........................ | 16/303 |
| 7,631,397 B2 * | 12/2009 | Yin et al. | ........................ | 16/330 |
| 2004/0202314 A1 * | 10/2004 | Lu et al. | ................ | 379/433.01 |

* cited by examiner

*Primary Examiner*—Chuck Y. Mah
(74) *Attorney, Agent, or Firm*—WPAT, P.C.; Anthony King

(57) ABSTRACT

A damping hinge apparatus includes a hinge and a damper. The damper has a damping shell, a damping cover, a damping body, an outer gasket and a rotating body. The damping cover is fixed in the damping shell and has a center hole defined, an inner wall of the center hole defines a plurality of loop-shaped groove perpendicular to the center hole and parallel each other. The damping body has a column portion received in the center hole, the column portion protrudes outward to form a plurality of rotating plates perpendicular to the column portion and parallel each other. The rotating plates engage the corresponding loop-shaped grooves. A bottom of the column portion connects a connecting portion located beneath the damping cover. The outer gasket is arranged around the connecting portion and against an inner side of the damping shell. Damping oil is filled between the outer gasket, the damping shell and the damping body.

7 Claims, 5 Drawing Sheets

DAMPING HINGE APPARATUS

BACKGROUND OF THE INVENTION

1. Field of the Invention

This present invention relates to a hinge apparatus, and more particularly to a damping hinge apparatus preferably applicable to folding or unfolding an electronic device such as a folding mobile phone, a portable computer and an electronic pocket notebook.

2. The Related Art

Conventionally, a portable apparatus, such as a portable computer and a folding mobile phone, has a body and a display joined by two hinges arranged in two sides of the portable apparatus.

Referring to FIG. 1, a traditional hinge 10 includes a housing 3, a sliding cam 5, a rotating cam 6, a spring 4, a shaft 7, an E-ring 8 and a washer 9. Two curving surfaces 51 are formed in an upper end of the sliding cam 5, the curving surfaces 51 show a V-shape. Two sliding portions 61 are formed in a lower end of the rotating cam 6. The sliding cam 5 and the rotating cam 6 are accepted in the housing 3, the two sliding portions 61 is rotatably against the curving surfaces 51 of the sliding cam 5. The washer 9 covers the bottom of the housing 3. The spring 4 is accepted in the housing 3, one end of the spring 4 is against the washer 9, the other end of the spring 4 is against a lower end of the sliding cam 5. A lower end of the shaft 7 forms a ring-shaped groove, the shaft 7 passes through the rotating cam 6, the sliding cam 5, the spring 4 and the washer 9, and the E-ring 8 is accepted in the ring-shaped groove of the shaft 7.

The rotating cam 6 is fixed with the display of the portable computer, the housing 3 is fixed with the body of the portable computer. Generally, the two traditional hinges 10 are arranged in the two sides of the portable computer to link the body and the display. When the portable computer is unfolded or folded, the sliding portions 61 slides along the curving surfaces 51 quickly to lower points of the curving surfaces 51, the rotating speed of the display around the body is quick, the display and the body are easy to be destroyed. If the traditional hinge 10 is arranged in a folding mobile phone, when the folding mobile phone is unfolded or folded, a display will strike a body of the folding mobile phone, the folding mobile phone will fall off the hand of the user carelessly.

SUMMARY OF THE INVENTION

Accordingly, an object of the invention is to provide a damping hinge apparatus which meets the technical requirements in the above-mention hinge apparatus.

The damping hinge apparatus includes a hinge adapted for producing and releasing an elastic force by rotating and a damper arranged coaxially with the hinge. The damper includes a damping shell, a damping cover fixed in the shell body of the damping shell, a damping body, an outer gasket and a rotating body. The damping shell has a cylinder-shaped shell body and a cover formed in the top of the shell body. The damping cover has a center hole which is coaxial with the shell body, an inner wall of the center hole defining a plurality of loop-shaped grooves coaxial with the center hole and parallel with each other. The damping body has a column portion received in the center hole, the column portion protrudes radially and outward to form a plurality of rotating plates parallel with each other, the rotating plates engage with the corresponding loop-shaped grooves, a bottom of the column portion connects a connecting portion located beneath the damping cover. The outer gasket is disposed on the connecting portion and pressed against an inner side of the shell body, damping oil is filled between the outer gasket, the damping shell and the damping body. One end of the rotating body engages with the hinge for rotating together with the hinge, the other end of the rotating body selectively engages with the damping body for pushing the damping body to rotate when the elastic force of the hinge is released.

As described above, the contact area between the damping body and the damping oil is added by the rotating plates and the loop-shaped grooves respectively defined in the damping body and the damping cover. Therefore, when the rotating body pushes the damping body, the damping body rotates more softly, and then the electronic device can be unfolded or folded more reliably.

BRIEF DESCRIPTION OF THE DRAWINGS

The invention, together with its objects and the advantages thereof may be best understood by reference to the following description taken in conjunction with the accompanying drawings, in which.

DETAILED DESCRIPTION OF THE PREFERRED EMBODIMENT

Figure 2:
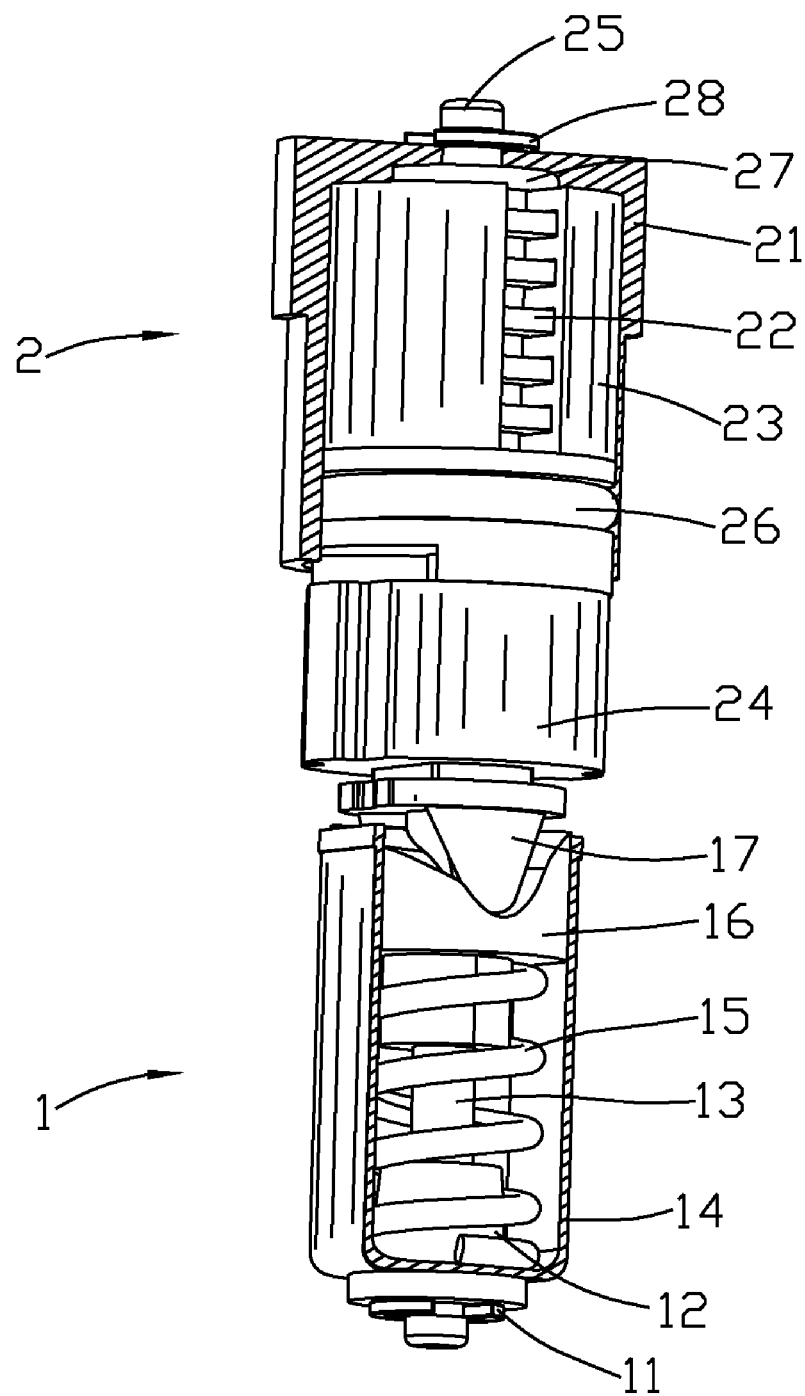
FIG. 2 is a perspective view of a damping hinge apparatus according to the present invention, wherein a damping shell and a housing of the damping hinge apparatus are dissected partly.
Figure 3:
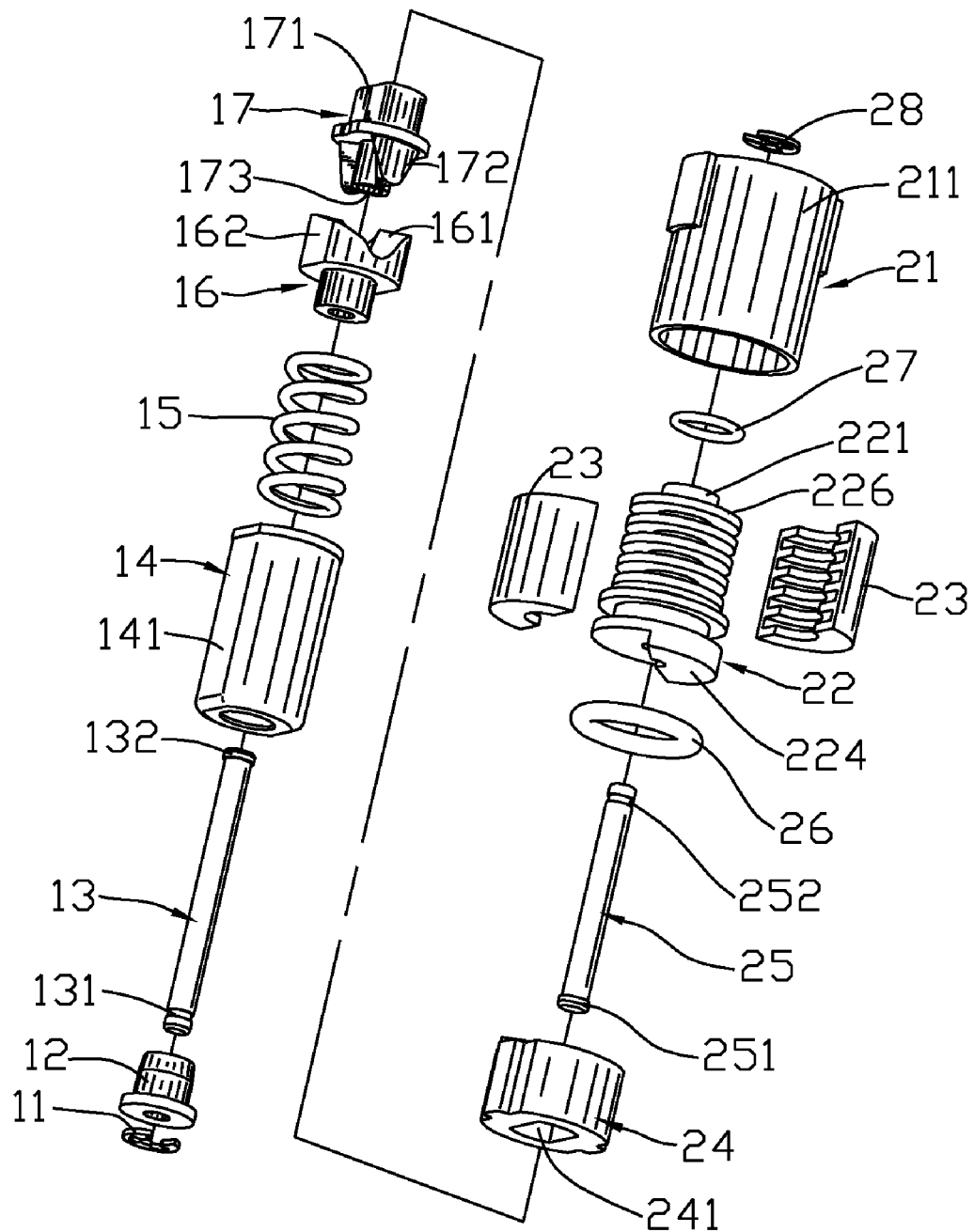
FIG. 3 is an exploded perspective view of the damping hinge apparatus in FIG. 2.

Please refer to FIGS. 2, and 3, a damping hinge apparatus according to the invention is shown. The damping hinge apparatus includes a hinge 1 and a damper 2. The damper 2 includes a damping shell 21, a damping body 22, a damping cover 23, a rotating body 24, a damping shaft 25 and a C-ring 28.

Figure 4:
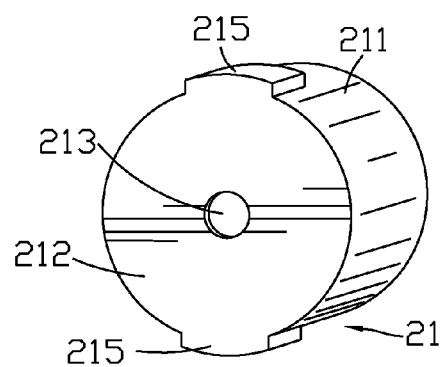
FIG. 4 is a perspective view showing the damping shell of the damping hinge apparatus in FIG. 3.
Figure 5:
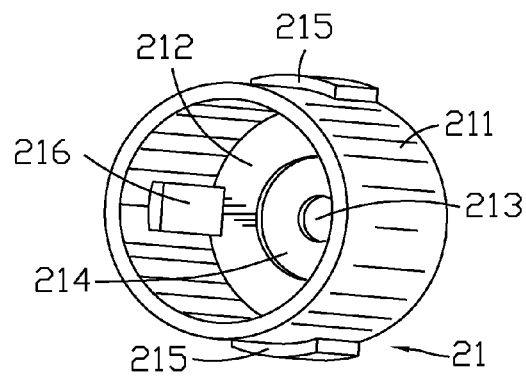
FIG. 5 is another perspective view of the damping shell in FIG. 4.

In FIGS. 4 and 5, the damping shell 21 has a shell body 211 showing a cylinder shape, a top of the shell body 211 forms a cover 212, an axis hole 213 is opened in the middle of the cover 212. An inner side of the cover 212 sinks to form an inner groove 214 showing a ring shape around the axis hole 213. An outer surface of the shell body 211 projects to form two lumps 215 symmetrically, when the damping shell 21 is arranged in an electronic device, the lumps 215 fastens the damping shell 21 in the electronic device to prevent the damping shell 21 from rotating in the electronic device. An inner side of the shell body 211 projects inward to form a projecting strip 216.

Figure 6:
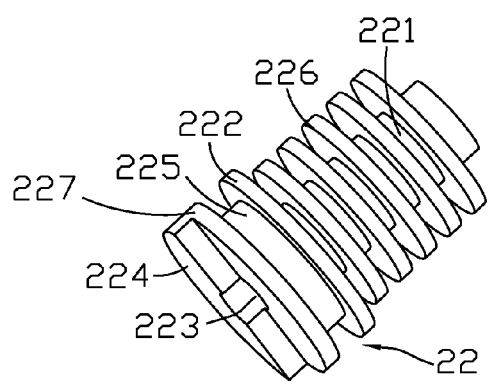
FIG. 6 is a perspective view of a damping body of the damping hinge apparatus in FIG. 3.
Figure 7:
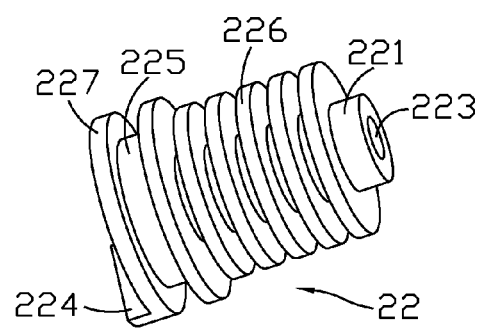
FIG. 7 is another perspective view of the damping body in FIG. 6.

Referring to FIGS. 3, 6 and 7, the damping body 22 is accepted in the damping shell 21. The damping body 22 has a column portion 221. An outer surface of the column portion 221 protrudes radially and outward to form a plurality of rotating plates 226 showing a ring shape, the rotating plates 226 are parallel each other and perpendicular to the column portion 221. A bottom of the column portion 221 extends downward to form a connecting portion 222, the connecting portion 222 shows a column shape, the diameter of the connecting portion 222 is larger than the diameter of the rotating plate 226. A bottom of the connecting portion 222 extends downward to form a protruding block 224 showing a fan shape at one side thereof. An outer side of the connecting portion 222 sinks inward to form a circle groove 225. In addition, the damping body 22 defines a rotating hole 223 along the axis thereof to pass through the column portion 221 and the connecting portion 222.

Figure 8:
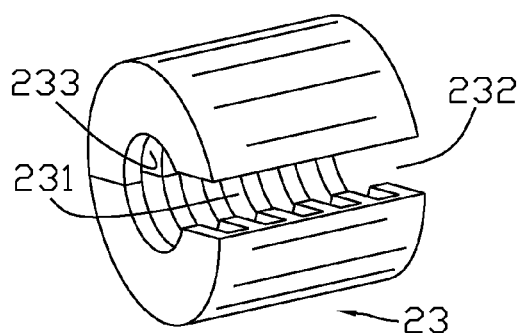
FIG. 8 is a perspective view of a damping cover of the damping hinge apparatus in FIG. 3.
Figure 9:
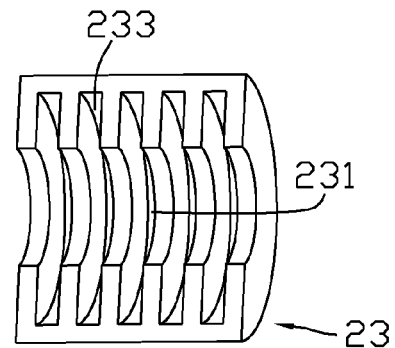
FIG. 9 is another perspective view of the damping cover of the damping hinge apparatus in FIG. 8.

In FIGS. 3, 8 and 9, the damping cover 23 includes two detachable portions matching each other at one side thereof along an axis direction thereof, the other sides of the two detachable portions are apart from each other to form a gap 232. The damping cover 23 has a center hole 231 defined between the two detachable portions along the axis thereof, the center hole 231 is coaxial with the shell body 211 of the damping shell 21. An inner wall of the center hole 231 defines a plurality of loop-shaped grooves 233 coaxial with the center hole 231 and parallel with each other. The column portion 221 of the damping body 22 is received in the center hole 231, a top of column portion 221 extends out from the center hole 231. The rotating plates 226 engage the corresponding loop-shaped grooves 233. The connecting portion 222 is located beneath the damping cover 23. The damping cover 23 is received in the shell body 211 of the damping shell 21, the gap 232 matches the projecting strip 216 to prevent the damping cover 23 from rotating relative to the damping shell 21.

Figure 10:
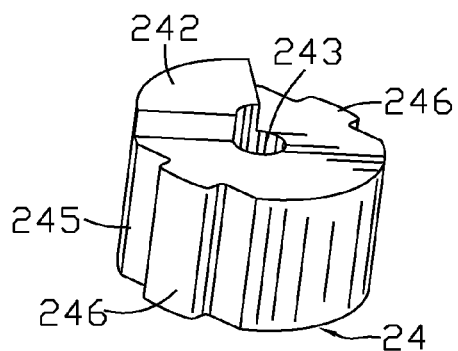
FIG. 10 is a perspective view of a rotating body of the damping hinge apparatus in FIG. 3.
Figure 11:
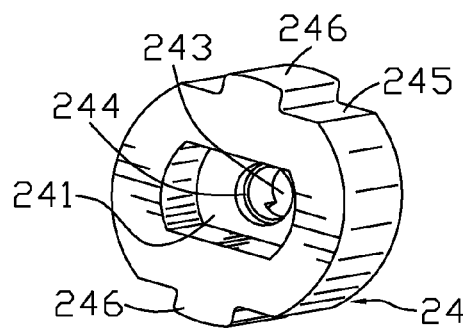
FIG. 11 is another perspective view of the rotating body of the damping hinge apparatus in FIG. 10.

Referring to FIGS. 3, 10 and 11, the rotating body 24 is arranged under the damping body 22. A bottom of the rotating body 24 sinks upward to form a connecting groove 241. A top of the rotating body 24 protrudes upward to form a protruding lump 242 showing a fan shape at one side thereof, the protruding lump 242 can rotate the damping body 22 when the protruding lump 242 resists and drives the protruding block 224. A middle hole 243 is opened in a top of the rotating body 24 to connect the connecting groove 241. A ring-shaped lump 244 projects from an inner side of the middle hole 243. Two limiting planes 245 are defined symmetrically at two sides of the rotating body 24, a limiting strip 246 protrudes outward from the limiting plane 245. When the rotating body 24 is fastened in the electronic device, the limiting planes 245 and the limiting strips 246 can fasten the rotating body 24 firmly in the electronic device to prevent the rotating body 24 from rotating in the electronic device.

Please refer to FIGS. 3, 5, 6 and 11, a bottom of the damping shaft 25 projects to form a projecting ring 251, a top of the damping shaft 25 defines a ring-shaped slot 252 therearound. The projecting ring 251 resists the ring-shaped lump 244, the top of the damping shaft 25 passes through the middle hole 243 of the rotating body 24, the rotating hole 223 of the damping body 22, and the axis hole 213 of the damping shell 21, then the ring-shaped slot 252 is exposed outside the cover 212 of the damping shell 21. The C-ring 28 is accepted in the ring-shaped slot 252 of the damping shaft 25 and against the cover 212 of the damping shell 21, so the rotating body 24, the damping body 22 and the damping shell 21 are assembled as a whole.

In FIGS. 2, 5 and 6, an outer gasket 26 covers in the circle groove 225 of the damping body 22. When the damping body 22 is accepted in the damping shell 21, the outer gasket 26 resists tightly an inner side of the shell body 211 of the damping shell 21. An inner gasket 27 is disposed on the top of the column portion 221 of the damping body 22. When the damping body 22 is accepted in the damping shell 21, the inner gasket 27 presses in the inner groove 214. So an airtight space is formed between the damping shell 21 and the damping body 22, damping oil is filled in the airtight space (not shown).

Figure 1:
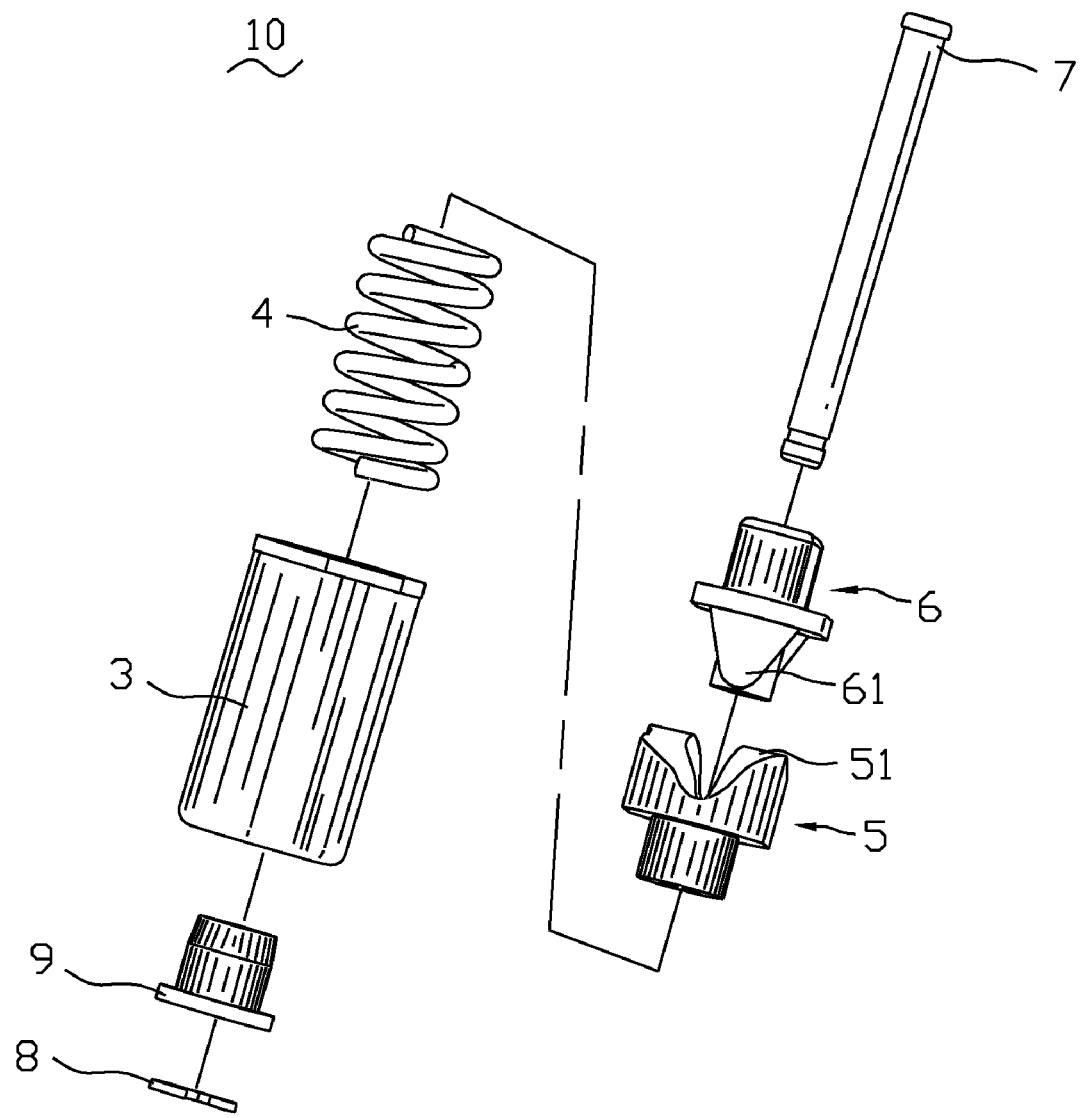
FIG. 1 is an exploded perspective view of a traditional hinge apparatus.

In FIG. 3, the hinge 1 includes an E-ring 11, a washer 12, a middle shaft 13, a housing 14, a spring 15, a sliding cam 16 and a rotating cam 17 arranged on the sliding cam 16. The hinge 1 is similar to the traditional hinge 10 in FIG. 1. Two limiting sides 141 are formed in an outer side of the housing 14. A circular opening 142 is opened in a bottom of the housing 14. A column-shaped aperture 121 is arranged in the washer 12 lengthwise.

The washer 12 is inserted in the circular opening 142 and against the bottom of the housing 14. The spring 15 is accepted in the housing 14 and above the washer 12. The sliding cam 16 is accepted in the housing 14 and above the spring 15. The top of the sliding cam 16 has two curving surfaces 161. Two stop sides 162 are formed in an outer side of the fixing cam 16 and resist inner sides of the limiting sides 141. An aperture 163 is opened along an axis of the sliding cam 16. An upper end of the rotating cam 17 forms a connecting section 171, a lower end of rotating cam 17 forms two sliding portions 172, the sliding portion 172 shows a V-shape, an axle hole 173 is opened in the rotating cam 17 from top to bottom. The sliding portions 172 resist the curving surfaces 161. The middle shaft 13 shows a longwise column shape, a ring-shaped notch 131 is opened in a bottom of the middle shaft 13, a protruding ring 132 is formed in a top of the middle shaft 13. For the diameter of the protruding ring 132 is larger than the diameter of the axle hole 173, the protruding ring 132 is against the top of the rotating cam 17. A bottom of the middle shaft 13 passes through the axle hole 173 of the rotating cam 17, the aperture 163 of the sliding cam 16, the spring 15, the circular opening 142 of the housing 14 and the column-shaped aperture 121 of the washer 12, then the E-ring 11 is located in ring-shaped notch 131.

In this embodiment, the connecting section 171 is accepted firmly in the connecting groove 241 of the rotating body 24 while the damping hinge apparatus is arranged in the electronic device. The rotating body 24 is arranged in a display of the electronic device, the housing 14 and the damping shell 21 are arranged in a base of the electronic device.

When the electronic device is unfolded or folded, the rotating body 24 rotates with the display, the rotating body 24 drives the rotating cam 17, the sliding portions 172 slide along the rising portions of the curving surfaces 161 of the sliding cam 16 respectively, the protruding lump 242 does not drive the protruding block 224, then the sliding portions 172 slide along the dropping portions of the curving surfaces 161 respectively, the protruding lump 242 of the rotating body 24 resists and drives the protruding block 224 of the damping body 22, so the damping body 24 rotates in the damping cover 23. Because the damping oil is filled between the damping shell 21 and the damping body 22, the display is unfolded softly, therefore, the electronic device is not destroyed in the unfolded or folded process.

As described above, the contact area between the damping body 22 and the damping oil is added by the rotating plates 226 and the loop-shaped grooves 233 respectively defined in the damping body 22 and the damping cover 23. Therefore, when the rotating body 24 pushes the damping body 22, the damping body 22 rotates more softly, then the electronic device can be unfolded or folded more reliably.

An embodiment of the present invention has been discussed in detail. However, this embodiment is merely a specific example for clarifying the technical contents of the present invention and the present invention is not to be construed in a restricted sense as limited to this specific example. Thus, the spirit and scope of the present invention are limited only by the appended claims.

What is claimed is:

1. A damping hinge apparatus comprising:
   a hinge adapted for producing and releasing an elastic force by rotating; and
   a damper arranged coaxially with the hinge, the damper having
      a damping shell having a cylinder-shaped shell body and a cover formed in the top of the shell body,
      a damping cover fixed in the shell body of the damping shell, the damping cover having a center hole which is coaxial with the shell body, an inner wall of the center hole defining a plurality of loop-shaped grooves coaxial with the center hole and parallel with each other,
      a damping body having a column portion received in the center hole, the column portion protruding radially and outward to form a plurality of rotating plates parallel with each other, the rotating plates engaging the corresponding loop-shaped grooves, a bottom of the column portion connecting a connecting portion located beneath the damping cover,
   an outer gasket disposed on the connecting portion and pressed against an inner side of the shell body, damping oil being filled between the outer gasket, the damping shell and the damping body, and
   a rotating body, one end of the rotating body engaging with the hinge for rotating together with the hinge, the other end of the rotating body selectively engaging with the damping body for pushing the damping body to rotate when the elastic force of the hinge being released.

2. The damping hinge apparatus as set forth in claim 1, wherein the damping cover defines a gap passing through an outer side thereof, the inner side of the shell body projects inward to form a projecting strip, the gap matches the projecting strip.

3. The damping hinge apparatus as set forth in claim 2, wherein the damping cover includes two detachable portions matching each other at one side thereof in axial direction thereof, the other sides of the two detachable portions are apart from each other to form the gap communicating with the center hole.

4. The damping hinge apparatus as set forth in claim 1, wherein an outer side of the connecting portion sinks inward to form a circle groove, the outer gasket is located in the circle groove.

5. The damping hinge apparatus as set forth in claim 1, wherein an inner side of the cover of the damping shell sinks to form an inner groove, the damper further comprises an inner gasket, the inner gasket is disposed on a top of the column portion extending out from the damping cover and pressed in the inner groove of the cover.

6. The damping hinge apparatus as set forth in claim 5, wherein the damper further comprises a damping shaft, one end of the damping shaft is fixed inside the rotating body, the other end of the damping shaft passes through the damping body, the inner gasket and the cover of the damping shell, and is locked with the cover.

7. The damping hinge apparatus as set forth in claim 1, wherein a bottom of the connecting portion disposes a protruding block at one side thereof, a top of the rotating body defines a protruding lump at one side thereof, the protruding lump rotates between two opposite sides of the protruding block for selectively engaging or disengaging with the protruding block.

* * * * *